US011205082B2

(12) United States Patent
Adeli-Mosabbeb et al.

(10) Patent No.: US 11,205,082 B2
(45) Date of Patent: Dec. 21, 2021

(54) SPATIOTEMPORAL RELATIONSHIP REASONING FOR PEDESTRIAN INTENT PREDICTION

(71) Applicants: TOYOTA RESEARCH INSTITUTE, INC., Los Altos, CA (US); The Board of Trustees of the Leland Stanford Junior University, Stanford, CA (US)

(72) Inventors: Ehsan Adeli-Mosabbeb, Stanford, CA (US); Kuan Lee, Los Altos, CA (US); Adrien Gaidon, Los Altos, CA (US); Bingbin Liu, Stanford, CA (US); Zhangjie Cao, Stanford, CA (US); Juan Carlos Niebles, Stanford, CA (US)

(73) Assignees: TOYOTA RESEARCH INSTITUTE, INC., Los Altos, CA (US); The Board of Trustees of the Leland Stanford Junior University, Stanford, CA (US)

( * ) Notice: Subject to any disclaimer, the term of this patent is extended or adjusted under 35 U.S.C. 154(b) by 83 days.

(21) Appl. No.: 16/596,662

(22) Filed: Oct. 8, 2019

(65) Prior Publication Data

US 2021/0103742 A1    Apr. 8, 2021

(51) Int. Cl.
*G06K 9/00*    (2006.01)
*G08G 1/01*    (2006.01)

(52) U.S. Cl.
CPC ..... *G06K 9/00805* (2013.01); *G06K 9/00348* (2013.01); *G08G 1/012* (2013.01); *G08G 1/0112* (2013.01)

(58) Field of Classification Search
CPC ........... G06K 9/00805; G06K 9/00348; G08G 1/012; G08G 1/0112
See application file for complete search history.

(56) References Cited

U.S. PATENT DOCUMENTS

| | | | |
|---|---|---|---|
| 9,760,806 B1 * | 9/2017 | Ning | G06N 3/0454 |
| 10,176,388 B1 * | 1/2019 | Ghafarianzadeh | G06T 7/174 |
| 2017/0270374 A1 | 9/2017 | Myers | |
| 2019/0080604 A1 | 3/2019 | Yogamani | |

OTHER PUBLICATIONS

Damien Teney et al. Graph-structured representation for visual question answering (Year: 2017).*

(Continued)

*Primary Examiner* — Dhaval V Patel
(74) *Attorney, Agent, or Firm* — Sheppard, Mullin, Richter & Hampton LLP; Hector A. Agdeppa; Daniel N. Yannuzzi

(57) ABSTRACT

A system and method for predicting pedestrian intent is provided. A prediction circuit comprising a plurality of gated recurrent units (GRUB) receives a sequence of images captured by a camera. The prediction circuit parses each frame of the sequence of images to identify one or more pedestrians and one or more objects. Using the parsed data, the prediction circuit generates a pedestrian-centric spatiotemporal graph, the parsed data comprising one or more identified pedestrians and one or more identified object. The prediction circuit uses the pedestrian-centric graph to determine a probability of one or more pedestrians crossing a street for each frame of the sequence of images.

20 Claims, 5 Drawing Sheets

(56) References Cited

OTHER PUBLICATIONS

Yunpeng Chen "Graph based Global Reasoning Networks" (Year: 2018).*
Danfei Xu, Scene graph generation by iterative Message passing (Year: 2017).*
Zellers, R. et al., Neural motifs: Scene graph parsing with global context. In Proceedings of the IEEE Conference on Computer Vision and Pattern Recognition, pp. 5831-5840, 2018.
Zeng, K.-H. et al., Agent-centric risk assessment: Accident anticipation and risky region localization. In Proceedings of the IEEE Conference on Computer Vision and Pattern Recognition, pp. 2222-2230, 2017.
Zhang, S. et al., Towards reaching human performance in pedestrian detection. IEEE transactions on pattern analysis and machine intelligence, 40(4):973-986, 2018.
Zhang, S. et al., Occlusionaware r-cnn: Detecting pedestrians in a crowd. In The European Conference on Computer Vision (ECCV), Sep. 2018.
Zhang, S. et al., Occluded pedestrian detection through guided attention in cnns. In The IEEE Conference on Computer Vision and Pattern Recognition (CVPR), Jun. 2018.
Zhou, B. et al., Temporal relational reasoning in videos. In Proceedings of the European Conference on Computer Vision (ECCV), pp. 803-818, 2018.
Zhou, C. et al., Bi-box regression for pedestrian detection and occlusion estimation. In The European Conference on Computer Vision (ECCV), Sep. 2018.
Rasouli et al., "Are They Going to Cross? A Benchmark Dataset and Baseline for Pedestrian Crosswalk Behavior", The IEEE International Conference on Computer Vision (ICCV), 2017, pp. 206-213.
Saleh et al., "Real-time Intent Prediction of Pedestrians for Autonomous Ground Vehicles via Spatio-Temporal DenseNet", arXiv:1904.09862, Apr. 22, 2019.
Abu Farha, Y. et al., When will you do what?-anticipating temporal occurrences of activities. In Proceedings of the IEEE Conference on Computer Vision and Pattern Recognition, pp. 5343-5352, 2018.
Aditya, S. et al., Image understanding using vision and reasoning through scene description graph. Computer Vision and Image Understanding, 173:33-45, 2018.
Alahi, A. et al., Social lstm: Human trajectory prediction in crowded spaces. In Proceedings of the IEEE conference on computer vision and pattern recognition, pp. 961-971, 2016.
Bandyopadhyay, T. et al., Intention-aware pedestrian avoidance. In Experimental Robotics, pp. 963-977. Springer, 2013.
Bonnin, S. et al., Pedestrian crossing prediction using multiple context-based models. In Intelligent Transportation Systems (ITSC), 2014 IEEE 17th International Conference on, pp. 378-385. IEEE, 2014.
Cao Z. et al., OpenPose: realtime multi-person 2D pose estimation using Part Affinity Fields. In arXiv preprint arXiv:1812.08008, 2018.
Chen, L. et al., Part-activated deep reinforcement learning for action prediction. In Proceedings of the European Conference on Computer Vision (ECCV), pp. 421-436, 2018.
Chen, Y. et al., Graph-based global reasoning networks. In CVPR, 2019.
Chen, Y. F. et al., Augmented dictionary learning for motion prediction. In Robotics and Automation (ICRA), 2016 IEEE International Conference on, pp. 2527-2534. IEEE, 2016.
Cong, W. et al., Scene graph generation via conditional random fields. arXiv preprint arXiv:1811.08075, 2018.
Fang Z. et al., Is the pedestrian going to cross? answering by 2d pose estimation. arXiv preprint arXiv:1807.10580, 2018.
Gerónimo D. et al., Vision-based pedestrian protection systems for intelligent vehicles. Springer, 2014.
Gupta, A. et al., Social gan: Socially acceptable trajectories with generative adversarial networks. In Proceedings of the IEEE Conference on Computer Vision and Pattern Recognition, pp. 2255-2264, 2018.
Insafutdinov, E. et al., Arttrack: Articulated multi-person tracking in the wild. In The IEEE Conference on Computer Vision and Pattern Recognition (CVPR), Jul. 2017.
Saleh, K. et al., Long-term recurrent predictive model for intent prediction of pedestrians via inverse reinforcement learning.
Iqbal, U. et al., Joint multiperson pose estimation and tracking. In The IEEE Conference on Computer Vision and Pattern Recognition (CVPR), Jul. 2017.
Jaipuria, N. et al., A transferable pedestrian motion prediction model for intersections with different geometries. arXiv preprint arXiv:1806.09444, 2018.
Japuria, N. et al., Casnsc: A contextbased approach for accurate pedestrian motion prediction at intersections. 2017.
Johnson, J. et al., Image generation from scene graphs. In Proceedings of the IEEE Conference on Computer Vision and Pattern Recognition, pp. 1219-1228, 2018.
Karasev, V. et al., Intentaware long-term prediction of pedestrian motion. In Robotics and Automation (ICRA), 2016 IEEE International Conference on, pp. 2543-2549. IEEE, 2016.
Kipf, T. N. et al., Semi-supervised classification with graph convolutional networks. arXiv preprint arXiv:1609.02907, 2016.
Kooij, J. F. P. et al., Context-based pedestrian path prediction. In European Conference on Computer Vision, pp. 618-633. Springer, 2014.
Koppula, H. S. et al., Anticipating human activities using object affordances for reactive robotic response. IEEE transactions on pattern analysis and machine intelligence, 38(1):14-29, 2016.
Kotseruba, I. et al., Joint attention in autonomous driving (jaad). arXiv preprint arXiv:1609.04741, 2016.
Li, J. et al., Learning to fuse things and stuff. arXiv preprint arXiv:1812.01192, 2018.
Lin, T.-Y. et al., Focal loss for dense object detection. In Proceedings of the IEEE international conference on computer vision, pp. 2980-2988, 2017.
Lin, T.-Y. et al., Microsoft coco: Common objects in context. In European conference on computer vision, pp. 740-755. Springer, 2014.
Liu, W. et al., Learning efficient single-stage pedestrian detectors by asymptotic localization fitting. In The European Conference on Computer Vision (ECCV), Sep. 2018.
Neuhold, G. et al., The mapillary vistas dataset for semantic understanding of street scenes. In Proceedings of the IEEE International Conference on Computer Vision, pp. 4990-4999, 2017.
Noh, J. et al., Improving occlusion and hard negative handling for single-stage pedestrian detectors. In The IEEE Conference on Computer Vision and Pattern Recognition (CVPR), Jun. 2018.
Quintero, R. et al., Pedestrian path prediction based on body language and action classification. In Intelligent Transportation Systems (ITSC), 2014 IEEE 17th International Conference on, pp. 679-684. IEEE, 2014.
Redmon, J. et al., Yolov3: An incremental improvement. arXiv preprint arXiv:1804.02767, 2018.
Ren, S. et al., Faster r-cnn: Towards real-time object detection with region proposal networks. In Advances in neural information processing systems, pp. 91-99, 2015.
Rhinehart, N. et al., First-person activity forecasting with online inverse reinforcement learning. In Proceedings of the IEEE International Conference on Computer Vision, pp. 3696-3705, 2017.
Ristani, E. et al., Features for multi-target multicamera tracking and re-identification. In The IEEE Conference on Computer Vision and Pattern Recognition (CVPR), Jun. 2018.
Sadeghian, et al., Sophie: An attentive gan for predicting paths compliant to social and physical constraints. arXiv preprint arXiv:1806.01482, 2018.
Shi, J. et al., Explainable and explicit visual reasoning over scene graphs. In AAAI, 2018.
Shi, Y. et al., Action anticipation with rbf kernelized feature mapping rnn. In Proceedings of the European Conference on Computer Vision (ECCV), pp. 301-317, 2018.
Tang, S. et al., Multiperson tracking by multicut and deep matching. In European Conference on Computer Vision, pp. 100-111. Springer, 2016.

(56) References Cited

OTHER PUBLICATIONS

Tang, S. et al., Multiple people tracking by lifted multicut and person reidentification. In The IEEE Conference on Computer Vision and Pattern Recognition (CVPR), Jul. 2017.
Teney, D. et al., Graph-structured representations for visual question answering. In Proceedings of the IEEE Conference on Computer Vision and Pattern Recognition, pp. 1-9, 2017.
Vazquez, D. et al., Virtual and real world adaptation for pedestrian detection. IEEE transactions on pattern analysis and machine intelligence, 36(4):797-809, 2014.
Wang, L. et al., Temporal segment networks: Towards good practices for deep action recognition. In ECCV, 2016.
Wang, X. et al., Repulsion loss: Detecting pedestrians in a crowd. In The IEEE Conference on Computer Vision and Pattern Recognition (CVPR), Jun. 2018.
Wojke, N. et al., Simple online and realtime tracking with a deep association metric. In Image Processing (ICIP), 2017 IEEE International Conference on, pp. 3645-3649. IEEE, 2017.
Xiu, Y. et al., Pose flow: Efficient online pose tracking. CoRR, abs/1802.00977, 2018.
Xu, D. et al., Scene graph generation by iterative message passing. In Proceedings of the IEEE Conference on Computer Vision and Pattern Recognition, pp. 5410-5419, 2017.
Xu, Y. et al., Encoding crowd interaction with deep neural network for pedestrian trajectory prediction. In The IEEE Conference on Computer Vision and Pattern Recognition (CVPR), Jun. 2018.
Yang, J. et al., Graph rcnn for scene graph generation. In Proceedings of the European Conference on Computer Vision (ECCV), pp. 670-685, 2018.
Yu, D. et al., Multi-person pose estimation for pose tracking with enhanced cascaded pyramid network. In European Conference on Computer Vision, pp. 221-226. Springer, 2018.

* cited by examiner

SPATIOTEMPORAL RELATIONSHIP REASONING FOR PEDESTRIAN INTENT PREDICTION

TECHNICAL FIELD

The present disclosure relates generally to predicting or forecasting, and in particular, some implementations may relate to a graph convolution-based framework for pedestrian-intent prediction.

DESCRIPTION OF RELATED ART

Reasoning over visual data has been a long-standing desirable capability for many different vision-based applications. One of the main applications of such reasoning is to forecast the next events or actions in videos. In recent years, various models have been developed based on convolution operations for prediction or forecasting, but they lack the ability to reason over spatiotemporal data and infer the relationships of different objects in the scene.

BRIEF SUMMARY OF THE DISCLOSURE

According to various embodiments of the disclosed technology, systems and methods of predicting pedestrian intent using spatiotemporal relationships is provided. Embodiments of the systems and methods disclosed herein provide a framework based on graph convolution to uncover the spatiotemporal relationships in the scene for reasoning about intents of the pedestrians. The scene graph is built on top of the segmented instances within and across video frames. Pedestrian intents, defined as the future actions of crossing or not-crossing the street, are very crucial pieces of information for autonomous vehicles to navigate safely and more smoothly.

In various embodiments, a method for predicting pedestrian intent is provided, the method comprising receiving, by a prediction circuit, a sequence of images from a camera; parsing, by the prediction circuit, each frame of the sequence of images to identify one or more pedestrians and one or more objects; generating, by the prediction circuit, a pedestrian-centric graph based on a plurality of parsed data, the parsed data comprising one or more identified pedestrians and one or more identified objects; and determining, by the prediction circuit, a probability of one or more identified pedestrians crossing a street for each frame of the sequence of images.

In various embodiments, a system for predicting pedestrian intent is provided, the system comprising one or more processors, at least one processor associated with a prediction circuit, the one or more processors communicatively coupled over a communication path; one or more memories communicatively coupled to the communication path; a camera disposed on an ego-centric vehicle and configured to capture a scene in front of the ego-centric vehicle, the camera communicatively coupled to the communication path; one or more sensors associated with the ego-centric vehicle and communicatively coupled to the communication path; and the prediction circuit comprising a pedestrian GRU and a context GRU configured to perform graph convolution on frames parsed from a sequence of images captured by the camera; and a dedicated prediction GRU configured to determine a probability one or more pedestrians within the frames parsed from the sequence of images will cross a street on which the ego-centric vehicle is operating, the determination made using a concatenated output of the pedestrian GRU and the context GRU.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
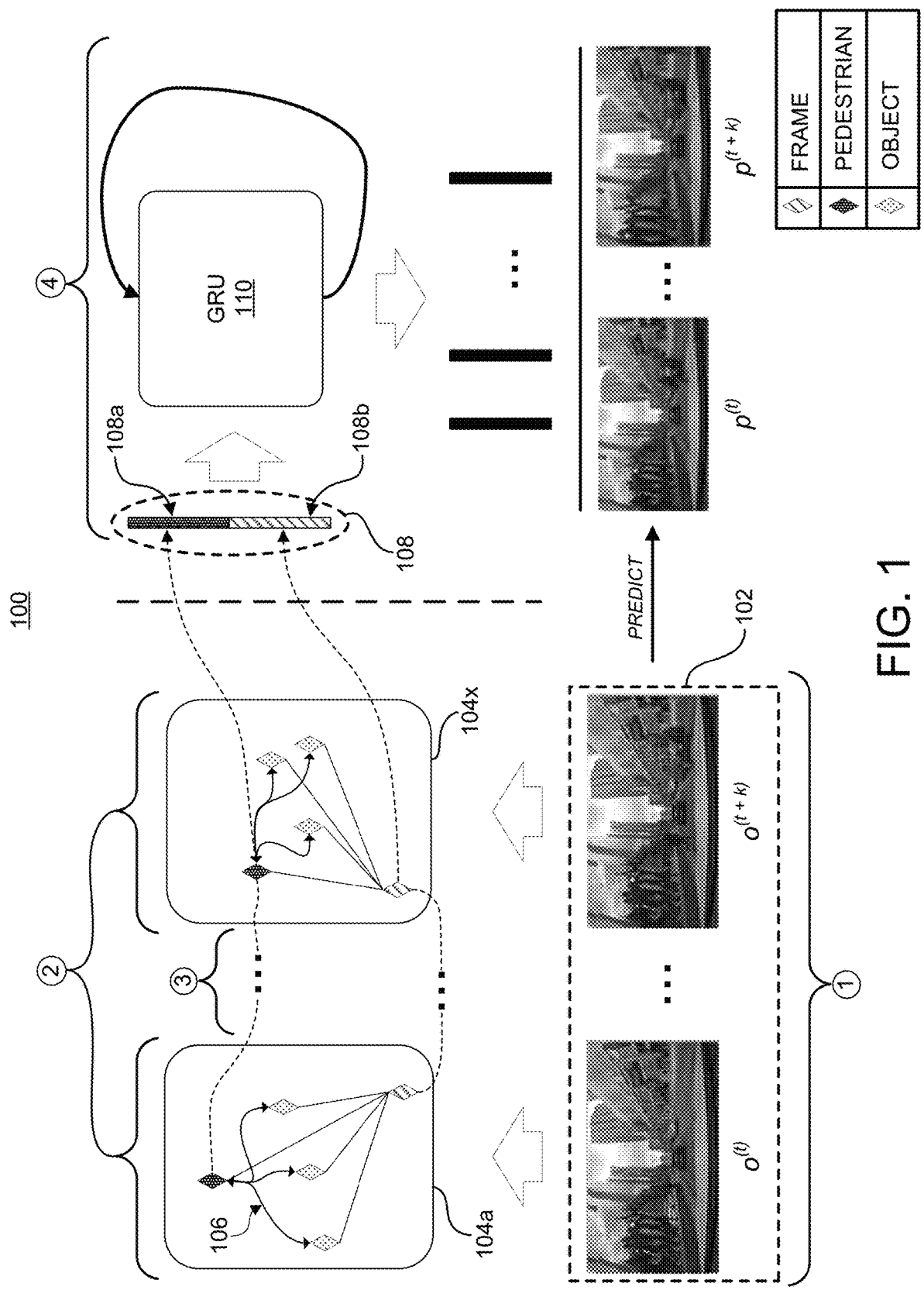
FIG. 1 provides a visual overview of an example pedestrian-intent prediction modelling process in accordance with embodiments of the technology disclosed herein.

The figures are not exhaustive and do not limit the present disclosure to the precise form disclosed.

DETAILED DESCRIPTION

Embodiments of the systems and methods disclosed herein provide a framework based on graph convolution to uncover the spatiotemporal relationships in the scene for reasoning about intents of the pedestrians. The scene graph is built on top of the segmented instances within and across video frames. Pedestrian intents, defined as the future actions of crossing or not-crossing the street, are very crucial pieces of information for autonomous vehicles to navigate safely and more smoothly.

For safe and smooth navigation while driving, humans take important and intuitive decisions. These decisions are ramifications of a sequence of actions and interaction with other in the scene. Human drivers can perceive the scene and anticipate if a pedestrian intends to cross the street or not. This is a simple, yet useful piece of information for deciding the next actions to take (e.g., slow down, speed up, or stop). This inclination can be made possible through inferring the interdependent interactions among pedestrians and with other items in the scene, like vehicles or traffic lights. Machines, on the other hand, lack this ability to read human judgments and intuitions with the very subtle gestures and interactions they make. This makes the autonomous driving vehicles very conservative and fussy and can be very nauseating for the riders and revolting for others on the road.

Developing algorithms that read pedestrian intuitions and make judgments based on them requires reasoning about the objects in the scene and how they interact, i.e., visual relationships. Most previous works modeling pedestrians focus on pedestrian detection and tracking, or behavior analysis. Although they have obtained convincing performance on several benchmarks, completion of such tasks is not enough for totally human-like driving. On the other hand, trajectory prediction addresses the problem to some extent by predicting the potential future position of the pedestrian. But predicting trajectories with high confidence long enough into the future is a very challenging task as many different and subtle factors change the trajectories of pedestrians. Contrarily, pedestrian intents are high-level semantic cues that can dramatically influence autonomous driving systems. Intent can be defined as their future and immediate action of whether they will cross the street or not. Anticipation and early prediction of pedestrian intents will help to demonstrate safer and more smooth driving behaviors.

Some approaches have taken pedestrian intent into consideration. They have typically tackled the problem by observing the pedestrian-specific features such as location, velocity, and pose. Although these cues can contribute to inferring the pedestrian intents, they ignore the context as well as pedestrian interactions with other objects in the scene, such as other pedestrians, vehicles, traffic signs, lights, and environmental factors like zebra-crossings. We argue that such factors can be uncovered through reasoning over the relationship across different objects in the scene. Therefore, we explore graph-based spatiotemporal modeling of the relationships in a recurrent framework.

The present disclosure proposes an approach for the pedestrian intent prediction problem based on visual relationship reasoning between pedestrians and objects within the scene. To this end, the technology disclosed herein generates a pedestrian-centric dynamic scene graph encoded with the spatiotemporal information between pedestrians and objects. As discussed in greater detail below, a sequence of images is parsed to detect instances of pedestrians and objects within each frame of the sequence, which may be performed using instance segmentation solutions known in the art. We then extract features from each instance (i.e., each pedestrian and/or object identified) in the image and reason about the relationship between pairs of instances through graph convolution techniques. One graph is defined for each pedestrian instance testifying to his/her intent. The pedestrian node is connected to all other instance nodes (e.g., each other pedestrian node and the object nodes) as well as a context node, which aggregates all the contextual visual information. To model pedestrian actions and interactions with others through time, we connect pedestrian and context nodes between consecutive frames to further reasoning about the temporal relations. This spatiotemporal modeling allows for capturing the intrinsic scene dynamics encoding the sequence of human subtle judgments and actions, which are very important for inferring the intents. In addition, we study the problem from a different point of view, by building a location-centric graph. In this setting, we predict how likely it is that a pedestrian will show up in front of the autonomous vehicle in the near future. This is critically important knowledge for an autonomous driving agent and our visual relationship reasoning is capable of modeling it. With such spatiotemporal relationship reasoning, we obtain reasonable results for intent prediction, which outperforms all baseline and previous methods.

In summary, the contributions of this work are two-fold: (1) We model the problem of intent prediction via instance-level spatiotemporal relationship reasoning and adopt graph convolution techniques to uncover individual intents; (2) Our modeling involves observing the problem from two different perspectives of pedestrian-centric and location-centric settings, both of which are crucial for autonomous driving applications.

Pedestrian detection and tracking are basic steps for reasoning about pedestrian intents. Previous work about vision-based pedestrian protection systems provides a thorough investigation of such methods based on shallow learning. Recently, various deep learning methods are proposed for single-stage detection, detection in a crowd, and detection at the presence of occlusion. All these methods obtain prominent accuracies for pedestrian detection. For pedestrian tracking, multi-person tracking methods are proposed to track every person in a crowded scene. Recently, tracking problems are simultaneously solved with pose estimation and person re-identification in a multi-task learning paradigm. Given the obtained promising results, we take them for granted and investigate visual reasoning schemes to understand the intrinsic intents of the pedestrians. That is, the technology disclosed herein goes beyond merely tracking a pedestrian within a scene, instead utilizing the relationship between a pedestrian and objects/other pedestrians in the scene to make a prediction as to the target pedestrian's intent whether or not to cross the street.

Trajectory prediction is another closely-related task for understanding the pedestrian intents. Recent works leverage human dynamics in different forms to predict trajectories. For instance, one such approach proposes Gaussian Process Dynamical Models based on the action of pedestrians and uses an intent function with speed, location, and heading direction as input to predict future directions. Other works incorporate environment factors into trajectory prediction. Some other works observe the past trajectories and predict the future. For instance, some solutions combines inverse reinforcement learning and bi-directional RNN to predict future trajectories. Another approach proposes a crowd interaction deep neural network to model the affinity between pedestrians in the feature space mapped by a location encoder and a motion encoder. A large body of trajectory prediction methods depends on top-down (i.e., bird's eye_ view. Among these works, Social LSTM incorporates common sense rules and social interactions to predict the trajectories of all pedestrians. Social GAN defines a spatial pooling for motion prediction. SoPhie introduces an attentive GAN to predicts individual trajectories leveraging the physical Constraints. Although obtained impressive results, these top-down view methods pose several limitations that make them inapplicable to egocentric applications, like self-driving cars and ours.

One can argue that if we can accurately predict the pedestrians future trajectories, we already know their intent. This is can be a valid argument if we have more annotations and stronger supervision at every time point in the future. However, such additional information adds complexity to the computations an autonomous driving vehicle would need to perform. The intent prediction in accordance with embodiments of the technology disclosed herein provide a high level understanding of the semantics of the future, simplifying the determinations needed to be made by an autonomous driving vehicle (which can be made using more useful and abstract information). Furthermore, trajectory prediction should be done in 3D space to provide enough information for identifying the pedestrians intents of the type in accordance with the present disclosure. This need for 3D data makes trajectory determination less suitable for use with simpler, 2D RGB images obtained from simpler image sensors (e.g., front-facing vehicle cameras), unlike the embodiments discussed herein. In addition, it is not a well-defined problem as future trajectories are often very contingent and cannot be predicted long enough into the future with enough certainty. Pedestrians make short term decisions on which path to select based on the obstacles present on their way, as well as based on the behavior of cars and other pedestrians present. Therefore, building a model to predict future trajectories and supervising to predict the exact observed trajectories is a not a feasible solution for use in an autonomous driving vehicle to understand the high-level intents of the pedestrians, where the increased complexity and information requirements would unacceptably increase the chance for incorrect predictions. In contrast, we look at the intent of the pedestrians defined in terms of future actions (i.e., cross or not-cross) based on reasoning over the relationship of the pedestrian(s) and other objects in the scene.

Pedestrian intent prediction is a relatively unexplored area of study. For instance, some work uses data from LIDAR and camera sensors to predict pedestrian intent based on location and velocity. One approach uses context information of roads, lanes, and zebra crossings to calculate 12 predefined crafted features as the cues for pedestrian intent prediction. A more recent work extracts features from keypoints generated by a pre-trained tracking and pose estimation models, and then integrates features of a fixed length neighboring frames to predict whether the pedestrian will cross. All these previous works were mainly based on crafted features and do not leverage the underlying information embedded in the scene, while our model incorporates relations among objects in the scene of their movements across different frames to encode the context information into a temporal connected spatial graph. This facilitates realistic visual reasoning to infer the intents, even in complex scenes.

Action anticipation and early prediction methods can be considered as the most relevant methodological ramifications of intent understanding. Among these works, one approach is to learn models to anticipate the next action by looking at the sequence of previous actions. Other works build spatiotemporal graphs for first-person action forecasting, or use object affordances and reinforcement learning for early action prediction. In contrast, instead of only looking at the data to build a data-driven forecasting model (which only provide forecasting based on statistical occurrences of activities to static scenes), embodiments of the technology disclosed herein build an agent-centric model that can reason on the scene and estimate the likelihoods of crossing or not crossing.

Scene graphs have been a topic of interest for understanding the relationships between objects encoding rich semantic information about the scene. The previous work generated scene graphs using global context, relationship proposal networks, conditional random fields, or iterative message passing. Such graphs built on top of visual scenes were used for various applications, including image generation and visual question answering. However, one of their main usages is reasoning about the scene, as they outline a structured representation of the image content. Among these works, some use scene graphs for explainable and explicit reasoning with structured knowledge, such as using directed and labeled scene description graph for reasoning in image captioning, retrieval, and visual question answering applications. Some methods for globally reasoning over regional relations in a single image. In contrast to the previous work, we build agent-centric (e.g., pedestrian-centric) graphs to depict the scene from the agent's point of view, rather than from the global perspective. Furthermore, instead of creating one single scene graph, we build a graph for each time-point and connect the important nodes across different times to encode the temporal dynamics (denoted by temporal connections). We show that these two characteristics can reveal pedestrian intents through reasoning on the temporal visual data.

The technology disclosed herein proposes a model that leverages the spatiotemporal context of the scene to make the prediction. Given a sequence of video frames observed in the past, the model first parses each frame into pedestrian and objects of interests, each of which is encoded to a feature vector. Then, for each pedestrian, we construct a pedestrian-centric spatiotemporal graph using the feature vector that encodes both scene context and the temporal history in the observed frame. Finally, an RNN is used to predict the crossing behavior of the pedestrian.

FIG. 1 provides a visual overview of an example pedestrian-intent prediction modelling process 100 in accordance with embodiments of the present disclosure. Example pedestrian-intent prediction modelling process 100 is provided for illustrative purposes and should not be interpreted as limited the scope of the technology disclosed herein to only the illustrative example.

Figure 2:
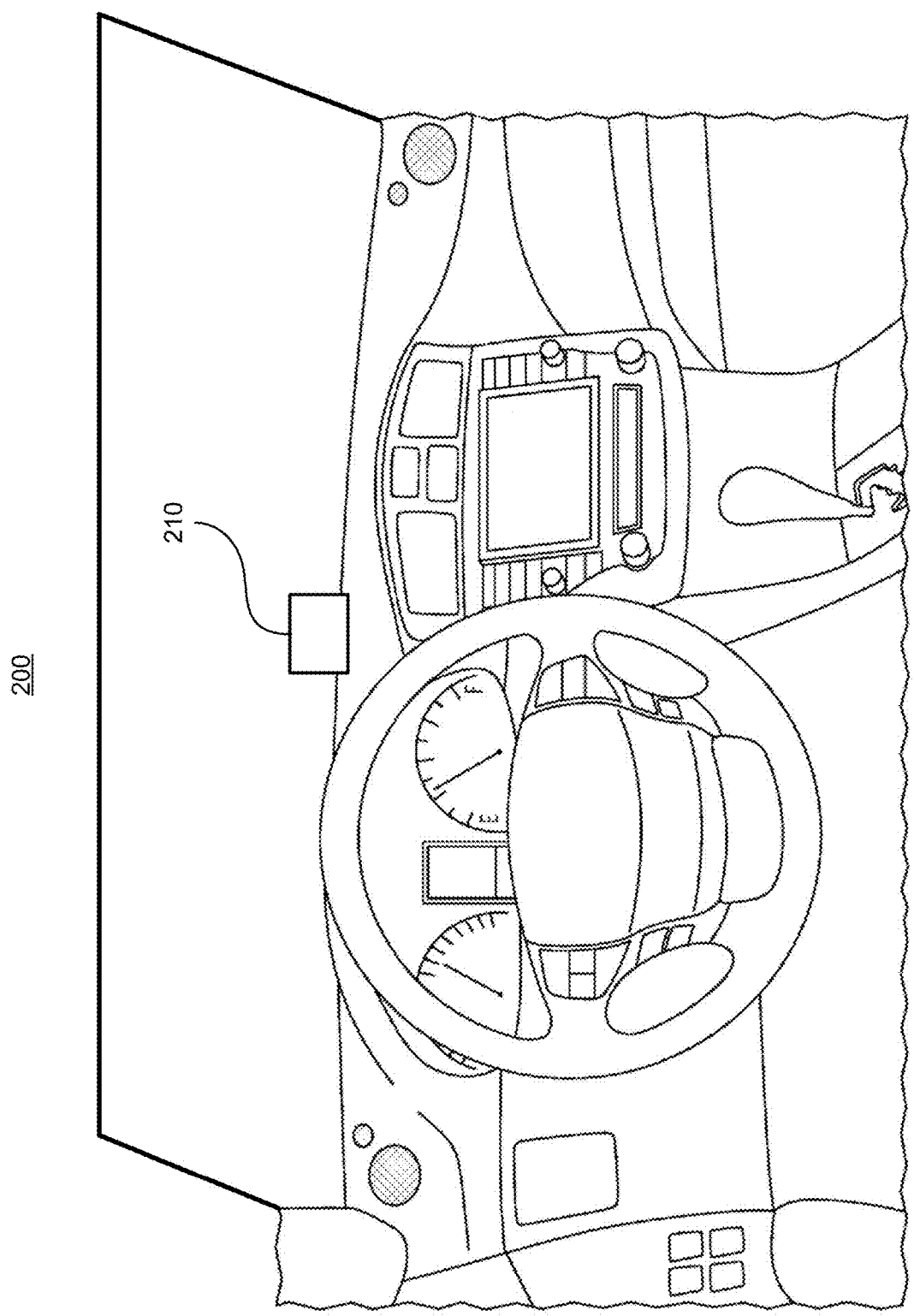
FIG. 2 illustrates an example ego-centric vehicle in which embodiments of the technology disclosed herein may be implemented.

Self-driving systems equipped with egocentric cameras (i.e., first-person vision cameras, such as the camera 210 shown in the example ego-centric vehicle 200 of FIG. 2) often need to cope with noisy information coming from busy views. The first stage (indicated by the reference numeral "1", i.e. "stage 1") in the pedestrian-intent prediction modelling process 100 involves parsing the scene captured by an egocentric camera. To minimize the impact of noisy information, embodiments of the technology disclosed herein parses the scene to remove information from which is irrelevant to predicting if a pedestrian is going to cross the street or not and identify pedestrians and objects within the scene. In various embodiments, the focus is kept on the pedestrian and objects of interest to a pedestrian's decision-making process.

As illustrated in FIG. 1, scene parsing takes a sequence of images 102 and identifies pedestrians within the images, as well as objects of interest. Objects of interest can include vehicles, road users, and environmental characteristics in various embodiments. Non-limiting examples of vehicles include buses, bicycles, cars, sport-utility vehicles (SUVs), motorcycles, pick-up trucks, semi-trucks, trailers, among other road vehicles. Non-limiting examples of road users include bicyclists, motorcyclists, scooterists, among other riders or operators of non-contained vehicles. Environmental characteristics includes elements within the scenes captured by the camera, including but not limited to crosswalks (e.g., a plain crosswalk, a zebra crosswalk, etc.), traffic lights, parking meters, fire hydrants, mailboxes, and other structures or items.

In various embodiments, detection of pedestrians is performed by using ground truth bounding boxes. Different non-pedestrian objects are identified through scene semantic segmentation. Bounding boxes are increasingly used for object detection in computer vision fields, and detecting pedestrians and objects within a scene are assumed to be a solved problem for purposes of the technology disclosed herein. A person of ordinary skill in the art would appreciate that the spatiotemporal pedestrian prediction technology disclosed in the present disclosure can be implemented with respect to any type of pedestrian and/or object detection approach. In various embodiments, known instance segmentation approaches can be used to parse the frames to identify the pedestrians and objects. Binary object masks are generated for each object (i.e., pedestrians, objects of interest). For each object, the union bounding box enclosing both the object and the pedestrian are cropped out such that the relative position of the object and the pedestrian can be preserved. In various embodiments, appearance information can be discarded during the scene parsing stage (stage 1), while the location and movement of the object relative to the pedestrian is the important factors affecting the pedestrian's crossing behavior the most, rather than the exact appearance of the object (e.g., color, texture, etc.). The cropped out pedestrian and union binary masks are encoded using one or more convolutional network architectures. In various embodiments, during training, the convolutional network architecture utilized to train implementations for deployment can be determined based on the level of resolution desired for a given implementation. As a non-limiting example, the cropped out pedestrian and union binary masks can be encoded using two separately tuned residual networks, each being 18 layers deep (ResNet-18) during the training stage.

To improve upon simpler data-driven approaches in the art, the technology disclosed herein augments the prediction model with context information, including both spatial context information from object in the scene, as well as temporal context from the history obtained through various frames. Utilizing this contextual information, a pedestrian-centric spatiotemporal graph is created (stage 2 and stage 3), spanning both space and time. Intuitively, each pedestrian or object corresponds to a graph node through graph convolution performed by gated recurrent units (GRUs) (stage 2, the temporal connection of stage 3 performed using GRUs explained in greater detail below), and the edges reflect the strength of the relationship between the two connected entities. A GRU is a gating mechanism utilized in recurrent neural networks, similar to a long short-term memory (LSTM), but only having two gates instead of the three gates of the LSTM. Although discussed with respect to GRUs, a person of ordinary skill in the art would appreciate that the technology disclosed herein can be implemented using other types of LSTM devices without undue effort.

The key provided in FIG. 1 describes the nodes contained within each graph 104$a$-$x$ created for each frame in sequence of frames 102. In various embodiments, the graph convolutional operation can be defined as:

$$Z = AXW, \quad (1)$$

where X is a matrix whose rows are feature vectors for the graph nodes, W is the trainable weight of a graph convolution layer, and A is the adjacency matrix of the graph. Note that the features of each graph node (i.e., objects or pedestrians) come from the output of the previously tuned ResNet-18 models, previously explained above.

Each pedestrian is modelled with a star graph 104$a$-$x$ centered at the pedestrian. In various embodiments, the edges 106 are defined using information from both the spatial relationship between the pedestrian and objects, as well as the appearance of the pedestrian. The spatial relationship is a good indicator of the importance of an object. As a non-limiting example, objects closer to the pedestrian should be more important than objects in the distance. The appearance of the pedestrian is also considered since it can serve as a strong cue to the pedestrian's intent, which can often be inferred from the head orientation or gazing direction. For example, an object to which the pedestrian is giving high attention should be associated with a heavier edge weight. As discussed above, a separate graph is generated for each pedestrian identified during the parsing stage (stage 1)

In various embodiments, the spatial relationship is defined by a vector defining the height and width of the union bounding box for an object. As a non-limiting example, the spatial relationship can be represented by a vector $s_i$ (i.e., spatial vector), whose entries include the height and width of the union bounding box and the differences between box corners and the center of the box. That is, the upper left corner can be represented by $\delta x^{(min)}$, $\delta y^{(min)}$, the lower right corner can be represented by $\delta x^{(max)}$, $\delta y^{(max)}$, and the center can be represented by $\delta x^c$, $\delta x^c$. The spatial vector can be combined with the feature representation of the pedestrian to calculate the edge weights. Formally, the edge weight for the $i_{th}$ object $o_i$ is:

$$s_i = [\delta x_i^{(min)}, \delta y_i^{(min)}, \delta x_i^{(max)}, \delta y_i^{(max)}, \delta x_i^c, \delta y_i^c, w_i, h_i]$$

$$v_i = [v_a, s_i]$$

$$w_i = \text{sigmoid}(\text{ReLU}(v_i) \cdot \text{ReLU}(v_o)), \quad (2)$$

where $v_a$ is the feature vector for the pedestrian capturing the appearance, and $v_0$ is the feature vector for the binary mask for object $o_i$, which are each obtained by feeding the ResNet-18 architectures by the cropped pedestrian and its binary mask, respectively.

For a graph with N object nodes, A (i.e., the adjacency matrix of equation (1)) is a symmetric matrix whose entries are (assuming $i \leq j$):

$$A[i, j] = \begin{cases} 1, & i = j \\ w_j, & i = 1, j \neq 1 \\ 0 & \text{otherwise} \end{cases} \quad (3)$$

where the first node is the pedestrian and the other N nodes correspond to the objects.

The pedestrian-centric star graph 104$a$-$x$ discussed above is constructed on each frame. To consider the temporal history, each pedestrian node in each frame is connected together through a temporal connection stage (stage 3). In various embodiments, a first GRU (also referred to herein as a pedestrian GRU) may be used to connect each pedestrian node temporally across frames, with the output of the pedestrian GRU at time t serving as the input pedestrian node at time t+1, while in other embodiments an LSTM network of a Quasi RNN (QRNN) network may be used (neither shown in FIG. 1). A similar temporal connection is made with respect to the objects by a second GRU, also referred to herein as a context GRU, used to temporally connect each object node across frames, providing context for the pedestrian nodes. In various embodiments, the pedestrian GRU and the context GRU may be combined into a single GRU configured to perform the graph convolution and temporal connection operations discussed with respect to stages 2 and 3 of FIG. 1. Modelling the temporal relation with respect to the pedestrians is easier than attempting to do so with respect to the contextual objects since the number of objects present in each frame may vary. Graph convolution, when performed properly, guarantees that information is sufficiently communicated among the nodes that explicitly drawing temporal associated among objects in different frames is unnecessary; the temporal information can be captured by the pedestrian node and passed to the context objects. Temporal connections in our case connect the pedestrian nodes and the context nodes across all frames, allowing the passage of information through graph convolution steps across the temporal dimension.

Leveraging the spatiotemporal context provided through the graph node representation, embodiments of the technology perform two layers of graph convolution on each observed frame, where the features for the pedestrian node and the context node are hidden states of the corresponding convolutional model utilized for prediction during the prediction stage (stage 4). As illustrated in FIG. 1, the pedestrian node feature vector 108a and context node feature vector 108b are generated, one from each layer of graph convolution.

For ease of discussion, the technology will be discussed with reference to an implementation wherein GRUs are used (i.e., the features for the pedestrian node and the context node are hidden states of the corresponding GRUs). After graph convolution, the refined pedestrian node feature vector 108a and context node feature vector 108b are concatenated at each frame to form a concatenated vector 108. Each concatenated vector 108 is aggregated in the prediction stage (stage 4). In other words, a sequence of concatenated vectors 108 is created.

As illustrated, the concatenated vector 108 serves as an input to the designated prediction GRU 110, which outputs a prediction regarding the future behavior of the pedestrian. The last hidden state of this GRU is used for anticipating crossing behavior in the future. In various embodiments, the designated prediction GRU 110 can predict the per-frame probability ($p^{(t)}$ to $p^{(t+k)}$) of crossing for up to K frames in the future, which may vary depending on the implementation. In various embodiments, the dedicated prediction GRU may be configured to aggregate the concatenated vectors 108 for K frames to serve as an input to the designated prediction GRU. The output of the prediction GRU is a vector for each time point. For each time point, two layers of neural networks are used and a sigmoid activation function is applied to convert the output to a probability value between zero and one for the pedestrian (i.e., probability of crossing). In various embodiments, this outputted value is compared against a threshold (e.g., 0.5) to create a final output predicting if a pedestrian will cross (i.e., value of '1') or will not cross (i.e., value of '0'). In various embodiments, if the output of the dedicated prediction GRU is less than 0.5, for that time point the prediction is classified as "will not cross" (i.e., equated to '0'), while if the output is greater than 0.5 it is classified as "will cross" (i.e., equated to '1'). In some embodiments, the opposite mapping may be used.

Although discussed in such a manner, a person of ordinary skill in the art would understand that the technology disclosed herein can be implemented using LSTM networks for the modelling in various embodiments, as GRU is one variant of LSTM. Nothing in this disclosure should be interpreted as limiting the scope of the technology to only GRU-implementations. A person of ordinary skill in the art would appreciate that the performance of GRUs and LSTMs are comparable.

As stated above, embodiments of the pedestrian-intent prediction modelling process 100 can be implemented within an ego-centric vehicle 200 shown in FIG. 200. For ease of discussion, only the relevant components of ego-centric vehicle 200 for the pedestrian-intent prediction modelling are shown in FIG. 2. However, a person of ordinary skill in the art would understand the other standard components of a vehicle, like ego-centric vehicle 200, known in the art to enable the vehicle to function, and therefore the omission of such components should not be interpreted as limiting the scope or affect the written description of the technology disclosed herein.

Figure 3:
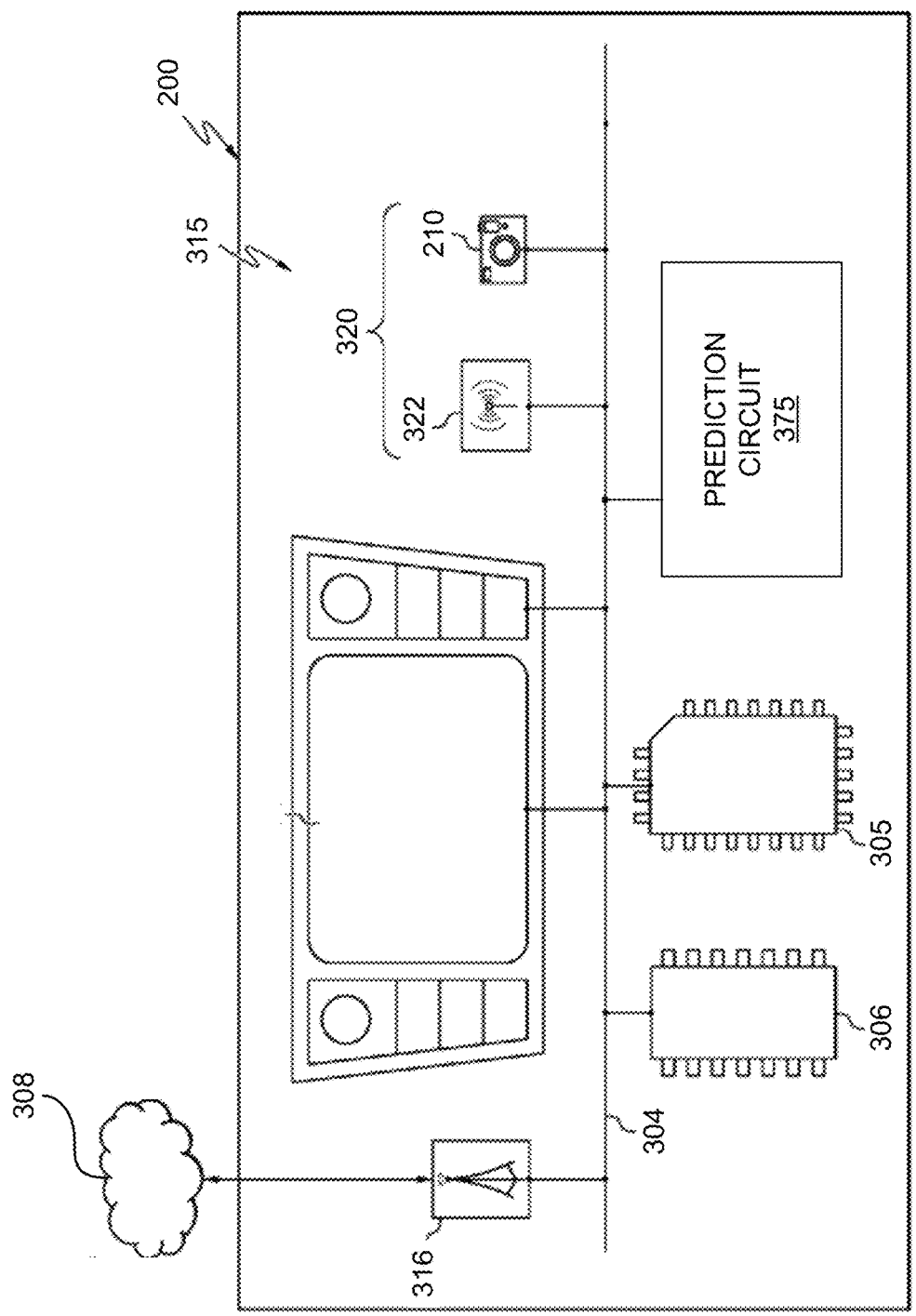
FIG. 3 illustrates components of a system of ego-centric vehicle in which embodiments of the technology disclosed herein can be implemented.

FIG. 3 illustrates the components of a system 315 of ego-centric vehicle 200 in which embodiments of the technology disclosed herein can be implemented. In various embodiments, system 315 may comprise an electronic control unit (ECU), such as an ECU commonly implemented in. System 315 includes one or more processors 305. Each of the one or more processors 305 may be any device capable of executing machine readable instructions. Accordingly, each of the one or more processors 305 may be a controller, an integrated circuit, a microchip, a computer, or any other computing device. The one or more processor 305 are coupled to a communication path 304 that provides signal interconnectivity between various modules. Accordingly, the communication path 304 may communicatively couple any number of processors 305 with one another, and allow the modules coupled to the communication path 304 to operate in a distributed computing environment.

Communication path 304 may be formed from any medium that is capable of transmitting a signal such as, for example, conductive wires, conductive traces, optical waveguides, or the like. In some embodiments, the communication path 304 may facilitate the transmission of wireless signals, such as WiFi, Bluetooth, and the like. Moreover, the communication path 304 may be formed from a combination of mediums capable of transmitting signals. In one embodiment, the communication path 304 comprises a combination of conductive traces, conductive wires, connectors, and buses that cooperate to permit the transmission of electrical data signals to components such as processors, memories, sensors, input devices, output devices, and communication devices. Accordingly, the communication path 304 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, among others, capable of traveling through a medium.

The ego-centric vehicle 200 further include one or more memory modules 306 coupled to the communication path 304. The one or more memory modules 306 may comprise RAM, ROM, flash memories, hard drives, or any device capable of storing machine readable instructions such that the machine readable instructions can be accessed by the one or more processors 305. The machine readable instructions may comprise logic or algorithm(s) written in any programming language of any generation, such as, for example, machine language that may be directly executed by the processor, or assembly language, object-oriented programming (OOP), scripting languages, microcode, etc., that may be compiled or assembled into machine readable instructions and stored on the one or more memory modules 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any suitable computer programming language, as pre-programmed hardware elements, or as a combination of hardware and software components. In various embodiments, the one or more memory modules 306 may include an image recognition database or algorithm to allow the pedestrian and object detection discussed above.

In various embodiments, ego-centric vehicle 200 comprises a network interface hardware 316 for communicatively coupling the ego-centric vehicle 200 to a network 308. In various embodiments, network interface hardware 316 can comprise either or both of a wireless transceiver circuit with an associated antenna and a wired I/O interface with an associated hardwired data port. A wireless transceiver circuit can include a transmitter and a receiver to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. A wired I/O interface can include a transmitter and receiver for hardwired communications with other devices. For example, wired I/O interface can provide a hardwired interface to other components, including sensors and other vehicle systems that are not germane to the technology disclosed herein. Wired I/O interface can communicate with other devices using Ethernet or any of a number of other wired communication protocols whether standardized, proprietary, open, point-to-point, networked or otherwise.

The ego-centric vehicle 200 may comprise one or more sensors 320 communicatively coupled to the one or more processors 305. The one or more sensors 320 include, but are not limited to, cameras, LiDAR, RADAR, and proximity sensors. For example, the one or more sensors 320 can include the camera 210 shown in FIG. 2. Although illustrated as being disposed on a dashboard of ego-centric vehicle 200, camera 210 can be disposed anywhere within the interior or exterior of the ego-centric vehicle 200 and configured to capture the scene in front of the ego-centric vehicle 200. In some embodiments, more than one camera 210 can be disposed in or on ego-centric vehicle 200 and be configured for use in the pedestrian-intent prediction modelling discussed herein. The camera 210 can be coupled to the communication path 304 such that the communication path 304 communicatively coupled the camera 210 to other modules of the ego-centric vehicle 200. The camera 210 may be any device having an array of sensing devices (e.g., pixels) capable of detecting radiation in an ultraviolet wavelength band, a visible light wavelength band, or an infrared wavelength band. The camera 210 may have any resolution. In various embodiments, the camera 210 and/or the one or more processors 305, based on input from the camera 210, may be able to determine the type of object the camera 210 is capturing through image recognition capabilities. For example, the camera 210 and/or the one or more processors 305 may be able to determine various objects within the scene, including but not limited to vehicles, cyclists, pedestrians, and other objects like those discussed above with respect to FIG. 1.

The ego-centric vehicle 200 may further include a second sensor 322 in addition to the camera 210. The second sensor 322 is coupled to the communication path 304 such that the communication path 304 communicatively coupled the second sensor 122 to other modules of the ego-centric vehicle 200. The second sensor 322 may be any device capable of outputting a signal.

A prediction circuit 375 may also be included in ego-centric vehicle 200. The prediction circuit 375 can be coupled to the communication path 304. Prediction circuit 375 may be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms may be included within prediction circuit 375. In various embodiments, prediction circuitry 375 can comprise the plurality of GRUs discussed above with respect to FIG. 1.

The prediction circuit 375 and/or the one or more processors 305 may implement a method of predicting pedestrian intent in a spatiotemporal manner, as discussed above with respect to FIG. 1, and in further detail with respect to FIG. 4 below. In some embodiments, the method may be implemented as logic within the machine readable instructions stored in the one or more memory modules 306, that, when executed by the one or more processors 305 and/or the prediction circuit 375, predicts whether a pedestrian is intending to cross the street or not dynamically, based on a sequence of images captured by the camera 210. The method can be trained using training data, either on the ego-centric vehicle 200 or in a central data center associated with network 308. The trained model (i.e., the machine readable instructions outlining how to make the prediction based on the trained model) can then be ported to the ego-centric vehicle 200 and stored in the one or more memories 306.

Figure 4:
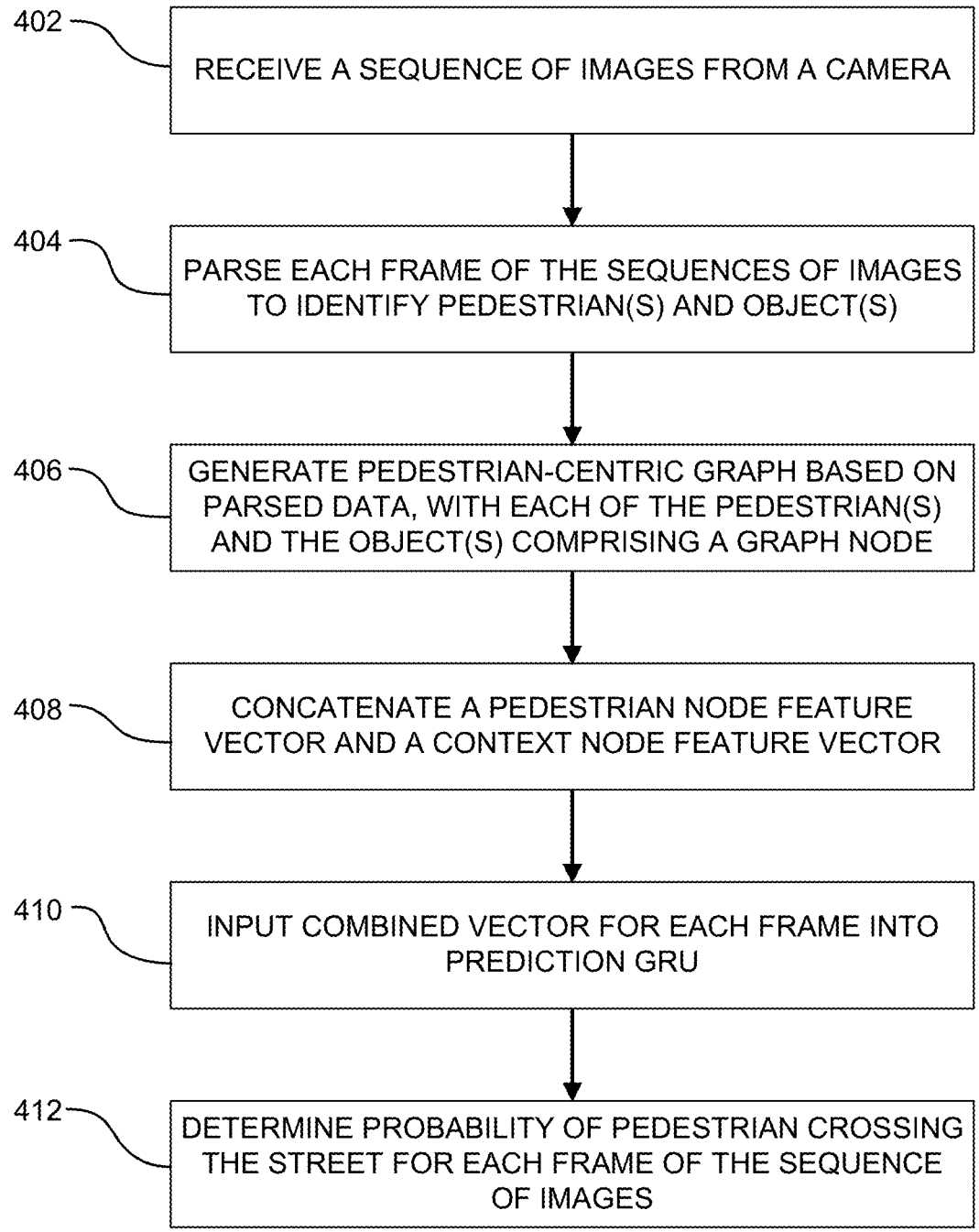
FIG. 4 is an example method in accordance with embodiments of the technology disclosed herein.

FIG. 4 is an example method 400 in accordance with embodiments of the technology disclosed herein. Although method 400 discloses a number of operations, the scope of the technology should not be interpreted as limited to only those operations shown. A person of ordinary skill in the art would understand that additional operations can be included without rendering method 400 inapplicable for predicting a pedestrian's crossing intent. The method 400 can be performed by an ECU within a vehicle configured for autonomous- or semi-autonomous driving (i.e., ego-centric vehicle). In various embodiments, method 400 can be performed by processing circuitry of a vehicle, such as the prediction circuit 375, the one or more processors 305, or a combination of both as discussed with respect to FIG. 3. The method 400 can be implemented in non-transitory machine readable instructions stored in one or more non-transitory storage media on the vehicle, such as the one or more memories 306 discussed with respect to FIG. 3.

At operation 402, a sequence of images are received from a camera in or on the vehicle. In various embodiments, the sequence of images can be received from any type of image sensor disposed in or on the vehicle and configured to capture the area in front of the vehicle. In some embodiments, the sequence of images can be received from a single camera, the single camera being disposed on the interior of the vehicle (e.g., dashboard camera, rear view mirror camera) or on the exterior of the vehicle (e.g., along a roof line on the front of the vehicle, grill camera, side view mirror camera). A plurality of cameras can be configured to generate the sequence of images in some embodiments. The images captured by the plurality of cameras may be processed to generate a combined frame including the information captured from all of the cameras in various embodiments.

After receiving the sequence of images, each frame of the sequences of the images are parsed to identify pedestrian(s) and object(s) at operation 404. The operation 404 may be similar to the first stage (stage 1) discussed above with respect to FIG. 1. In various embodiments, bounding boxes may be used as ground truth for identifying pedestrians and objects. Parsing at operation 404 can remove irrelevant information from the frame, and in some embodiments the appearance information for objects (not pedestrians) within the frame can be discarded. Parsing generates location and movement information for each object relative to the pedestrian.

At operation 406, a pedestrian-centric graph is generated based on the parsed data. In various embodiments, operation 406 may comprise the functions of the second stage (stage 2) discussed above with respect to FIG. 1. The graph can be defined according to the graph convolution operation defined by equation 1 discussed above with respect to FIG. 1 in various embodiments. In some embodiments, the graph is a star-graph centered at the pedestrian. As discussed above, each edge is defined using information from both the spatial relationship between the pedestrian and the objects, as well as the appearance of the pedestrian. In various embodiments, the edge weights can be used to indicated the relative importance of each object with respect to the pedestrian, the edge weights being determined based on equations 2 and 3 as discussed above. In various embodiments, operation 406 can connect the pedestrian nodes in each frame using a GRU to encode the temporal relationship into the node features vectors, similar to the temporal connection of the third stage (stage 3) discussed above with respect to FIG. 1.

Through graph convolution at operation 406, a refined pedestrian node feature vector and a refined context node feature vector are generated for each frame. Each refined vector comprises entries encoded with both the spatial and temporal characteristics for the pedestrian or the objects (i.e., the context node). Through graph convolution, the symmetric matrix is generated (such as the symmetric matrix discussed above with respect to equation 3 above). After performing the graph convolution at operation 406, the refined pedestrian node feature vector and the refined context node feature vector are concatenated at operation 408 to form a combined vector. The concatenation can be performed in a manner similar to that discussed above with respect to FIG. 1.

The combined vector for each frame is input into a designated prediction GRU at operation 410. In various embodiments, the combined vector from the previous frame serves as the hidden frame for each subsequent frame. The prediction GRU then determines the probability of a pedestrian crossing the street in each frame of the sequence of frames at operation 412. The determination is based on the inputted combined vector for each frame. The determination can be similar to the fourth stage (stage 4) discussed with respect to FIG. 1 above.

The technology disclosed herein provides benefits over several baseline models of pedestrian detection and action anticipation. The method in accordance with the embodiments of the technology disclosed herein is evaluated using the Joint Attention Autonomous Driving (JAAD) dataset, with the results being compared against a range of baselines. JAAD contains videos captured with a front-view camera under various scenes, weathers, and lighting conditions. There are 346 videos with 82,032 frames, where the length of videos ranges from 60 frames to 930 frames. Each video may contain multiple pedestrians with ground truth labels on 2D locations in the frame and nine actions. For ease of discussion, the metrics discussed below are focused on predicting only the action of crossing, but for training purposes all nine action labels were used. The dataset is split into 250 videos for training and the rest for testing, which correspond to 460 pedestrians and 253 pedestrians, respectively. The crossing action is roughly balanced, with 44.30% frames labeled as crossing and 55.70% as non-crossing throughout the dataset.

As discussed above, the model in accordance with embodiments of the present disclosure takes in T frames as past observation, and predict the per-frame probability of crossing for up to K frames in the future. To assist in estimating how prediction performance scales as the temporal horizon increases (i.e., larger K), the performance discussed below is averaged over the K future frames, as well as providing the performance on the $K^{th}$ frame.

The comparison of the technology disclosed herein is conducted with respect to four baseline models. The first baseline model is a pose-based method, which predicts the crossing behavior using pose key points. For each frame, the input is a vector containing 18 2D coordinates from nine joints (neck, left/right shoulder, left/right hip, left/right knee, left/right ankle). The second baseline model is a one-dimensional (1D) convolutional neural network (CNN). As future crossing behavior can be considered as a type of action anticipation, the 1D CNN is used because it predicts the future action labels directly from the observed action labels. A temporal segment network (TSN) serves as the third baseline model. A TSN is a sparse temporal sampling strategy that extracts short snippets over a long video sequence with a spares sampling scheme, where the samples distribute uniformly along the temporal dimension. A segmental structure is then employed to aggregate information from the sampled snippets. The fourth baseline model is a temporal relation network (TRN). The TRN experiments are conducted on both the single-scale and the multi-scale version. Because the TRN predictions are based on features from frame tuples, no frame-wise prediction was available for direct comparison to the technology disclosed herein. Accordingly, the TRN results are only reported on the last prediction setting, where only one final prediction is needed.

Table 1 below shows the results comparing the technology disclosed herein with the baselines, where the embodiment of the disclosed technology outperforms the baselines by a large margin. One possible explanation is that most of the baseline models are geared towards action recognition, early action recognition, or action anticipation, and are hence not optimized for explicit modelling of pedestrian intention (unlike the technology of the present disclosure).

TABLE 1

| Model | Avg. on First 30 Frames | $30^{th}$ Frame |
|---|---|---|
| Pose-Based | 67.00% | 67.00% |
| 1D CNN | 72.78% | 69.65% |
| TSN | 67.18% | 63.64% |
| TRN | N/A | 63.74% |
| Present Disclosure | 79.28% | 76.98% |

Figure 5:
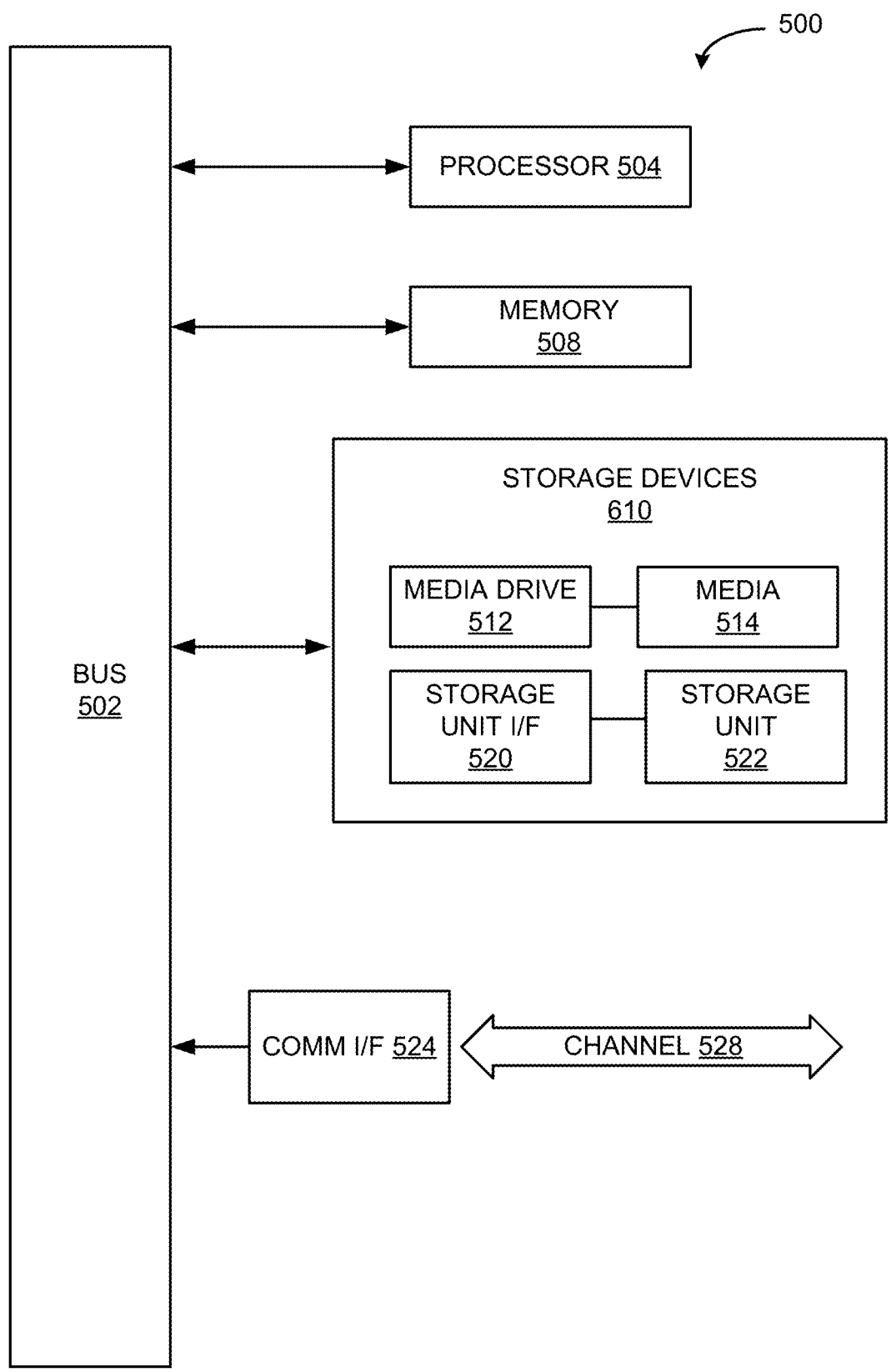
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up the system 315. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
    receiving, by a prediction circuit, a sequence of images from a camera;
    parsing, by the prediction circuit, each frame of the sequence of images to generate parsed data indicative of one or more pedestrians and one or more objects identified in the sequence of images;
    generating, by the prediction circuit and for each frame of the sequence of images, a pedestrian-centric graph for each of the one or more pedestrians based on the parsed data, wherein each pedestrian-centric graph corresponds to a respective pedestrian of the one or more pedestrians and represents the one or more objects from a perspective of the respective pedestrian; and
    determining, by the prediction circuit, a probability for each of the one or more identified pedestrians crossing a street for each frame of the sequence of images.

2. The method of claim 1, further comprising concatenating, by the prediction circuit, a pedestrian node feature vector and a context node feature vector for each frame of the sequence of images.

3. The method of claim 1, wherein generating the pedestrian-centric graph comprises performing graph convolution on a plurality of feature vectors associated with each frame of the sequence of images.

4. The method of claim 3, each feature vector of the plurality of feature vectors comprising a row of a graph vector matrix.

5. The method of claim 3, wherein performing graph convolution comprises multiplying a graph vector matrix, a trainable weigh matrix of a graph convolution layer, and an adjacency matrix.

6. A non-transitory machine-readable storage medium storing non-transitory instructions that, when executed by a processor, causes the processor to:
    receive a sequence of images from a camera;
    parse each frame of the sequence of images to generate parsed data indicative of one or more pedestrians and one or more objects identified in the sequence of images;
    generate, for each frame of the sequence of images, a pedestrian-centric graph for each of the one or more pedestrians based on the parsed data, wherein each pedestrian-centric graph corresponds to a respective pedestrian of the one or more pedestrians and represents the one or more objects from a perspective of the respective pedestrian; and
    determine a probability for each of the one or more identified pedestrians crossing a street for each frame of the sequence of images.

7. The non-transitory machine-readable storage medium of claim 6, further comprising non-transitory instructions to cause the processor to concatenate a pedestrian node feature vector and a context node feature vector for each frame of the sequence of images.

8. The non-transitory machine-readable of claim 6, wherein the non-transitory instruction to generate the pedestrian-centric graph comprises performing graph convolution on a plurality of feature vectors associated with each frame of the sequence of images.

9. The non-transitory machine-readable of claim 8, each feature vector of the plurality of feature vectors comprising a row of a graph vector matrix.

10. The non-transitory machine-readable of claim 8, wherein performing graph convolution comprises multiplying a graph vector matrix, a trainable weigh matrix of a graph convolution layer, and an adjacency matrix.

11. A system comprising:
    one or more processors, at least one processor associated with a prediction circuit, the one or more processors communicatively coupled over a communication path;
    one or more memories communicatively coupled to the communication path;
    a camera disposed on an ego-centric vehicle and configured to capture a scene in front of the ego-centric vehicle, the camera communicatively coupled to the communication path;
    one or more sensors associated with the ego-centric vehicle and communicatively coupled to the communication path; and
    the prediction circuit comprising:
        a pedestrian gated recurrent unit (GRU) and a context GRU configured to perform graph convolution on frames parsed from a sequence of images captured by the camera, wherein the pedestrian GRU is configured to temporally connect a first pedestrian node in a first pedestrian-centric graph constructed for a first frame to a second pedestrian node in a second pedestrian-centric graph constructed for a second frame subsequent to the first frame; and
        a dedicated prediction GRU configured to determine a probability one or more pedestrians within the frames parsed from the sequence of images will cross a street on which the ego-centric vehicle is operating, the determination made using a concatenated output of the pedestrian GRU and the context GRU.

12. The system of claim 11, further comprising a network interface communicatively coupled to the communication path.

13. The system of claim 11, the context GRU configured to temporally connect one or more objects between each frame parsed from the sequence of images.

14. The system of claim 11, the prediction circuit configured to determine the probability by:
  receiving the sequence of images from a camera;
  parsing each frame of the sequence of images to generate parsed data indicative of one or more pedestrians and one or more objects identified in the sequence of images; and
  generating a plurality of pedestrian-centric graphs based on the parsed data.

15. The system of claim 11, the prediction circuit further configured to concatenate a pedestrian node feature vector output by the pedestrian GRU and a context node feature vector output from the context GRU for each frame of the sequence of images.

16. The system of claim 11, wherein the first pedestrian node in the first pedestrian-centric graph and the second pedestrian node in the second pedestrian-centric graph relate to a same pedestrian at different points in time.

17. The system of claim 11, wherein the pedestrian GRU is configured to temporally connect the first pedestrian node and the second pedestrian node by utilizing an output of the pedestrian GRU at a first time associated with the first frame as an input to the second pedestrian node at a second time associated with the second frame.

18. The system of claim 17, wherein the first frame and the second frame are temporally consecutive frames.

19. The method of claim 1, wherein each pedestrian-centric graph includes a respective pedestrian node representing the respective pedestrian, wherein the respective pedestrian node is connected to each of the one or more objects by a corresponding edge, and wherein a weight of each edge represents a relative importance of a corresponding object to the respective pedestrian.

20. The method of claim 19, wherein the one or more objects is a plurality of objects comprising a first object and a second object, and wherein generating a particular pedestrian-centric graph for a particular pedestrian of the one or more pedestrians comprises:
  determining that the particular pedestrian is directing a greater amount of attention to the second object than the first object;
  representing the first object with a first node in the particular pedestrian-centric graph;
  representing the second object with a second node in the particular pedestrian-centric graph;
  representing the particular pedestrian with a pedestrian node in the particular pedestrian-centric graph;
  assigning a first weight to a first edge connecting the first node and the pedestrian node;
  assigning a second weight to a second edge connecting the second node and the pedestrian node, the second weight being larger than the first weight.

* * * * *